United States Patent
Yamashita

(10) Patent No.: US 11,386,403 B2
(45) Date of Patent: Jul. 12, 2022

(54) MAINTENANCE MANAGEMENT SYSTEM

(71) Applicant: TOSHIBA TEC KABUSHIKI KAISHA, Tokyo (JP)

(72) Inventor: Koudai Yamashita, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/078,292

(22) Filed: Oct. 23, 2020

(65) Prior Publication Data

US 2021/0192472 A1   Jun. 24, 2021

(30) Foreign Application Priority Data

Dec. 24, 2019 (JP) ............... JP2019-233061

(51) Int. Cl.
  *G06Q 10/00* (2012.01)
  *G09G 5/00* (2006.01)
  *G06Q 20/20* (2012.01)
  *H04B 10/116* (2013.01)

(52) U.S. Cl.
  CPC ........... *G06Q 10/20* (2013.01); *G06Q 20/202* (2013.01); *G09G 5/006* (2013.01); *G09G 2354/00* (2013.01); *G09G 2370/18* (2013.01); *H04B 10/116* (2013.01)

(58) Field of Classification Search
  CPC ...................................... G06Q 10/20
  See application file for complete search history.

(56) References Cited

U.S. PATENT DOCUMENTS

| | | | |
|---|---|---|---|
| 2008/0256098 A1* | 10/2008 | Kim | G06Q 50/01 |
| 2015/0188632 A1* | 7/2015 | Aoyama | H04B 10/1149 398/118 |
| 2016/0005309 A1 | 1/2016 | Aoyama et al. | |
| 2017/0168764 A1* | 6/2017 | Kawamori | G06F 3/1273 |

FOREIGN PATENT DOCUMENTS

JP   2013-029881   2/2013

\* cited by examiner

*Primary Examiner* — Gustavo Polo
(74) *Attorney, Agent, or Firm* — Amin, Turocy & Watson, LLP

(57) ABSTRACT

According to one embodiment, a maintenance management system includes a mobile terminal of a maintenance staff, and a maintenance target device to be maintained by the maintenance staff. The maintenance target device includes detection means, comparison means, and transmission means. The detection means detects a maintenance work of the maintenance staff. The comparison means compares a first log which is a log of a correct maintenance work in each process of a maintenance content with a second log which is a log of the maintenance work detected by the detection means. The transmission means transmits a comparison result obtained by the comparison of the comparison means. The mobile terminal includes reception means and display control means. The reception means receives the comparison result. The display control means causes the maintenance work of the process to be displayed based on the comparison result received by the reception means.

17 Claims, 7 Drawing Sheets

MAINTENANCE MANAGEMENT SYSTEM

CROSS-REFERENCE TO RELATED APPLICATION

This application is based upon and claims the benefit of priority from Japanese Patent Application No. 2019-233061, filed Dec. 24, 2019, the entire contents of which are incorporated herein by reference.

FIELD

Embodiments described herein relate generally to a maintenance management system, and devices methods related thereto.

BACKGROUND

In the related art, a maintenance staff of a maintenance target device performs a maintenance work according to a procedure manual that discloses a maintenance procedure and their own rules of thumb. However, the maintenance staff may perform a maintenance work that is different from a correct maintenance work due to misunderstandings or a work mistake. In such a case, the maintenance staff may take a longer period of time than time expected for the maintenance work, or may not be able to finish the maintenance work normally. Therefore, a technology that enables a maintenance work in the correct procedure is required.

DETAILED DESCRIPTION

An aspect of the present embodiment is to provide a maintenance management system capable of supporting a maintenance work in a correct procedure.

In general, according to one embodiment, a maintenance management system includes a mobile terminal of a maintenance staff, and a maintenance target device to be maintained by the maintenance staff. The maintenance target device includes detection means, comparison means, and transmission means. The detection means detects a maintenance work of the maintenance staff. The comparison means compares a first log which is a log of a correct maintenance work in each process of a maintenance content with a second log which is a log of the maintenance work detected by the detection means. The transmission means transmits a comparison result obtained by the comparison of the comparison means. The mobile terminal includes reception means and display control means. The reception means receives the comparison result. The display control means causes the maintenance work of the process to be displayed based on the comparison result received by the reception means.

Hereinafter, with reference to the accompanying drawings, an embodiment of a maintenance management system is specifically described. The embodiment described below is an embodiment of the maintenance management system and is not intended to limit the configuration or specification thereof.

Figure 1:
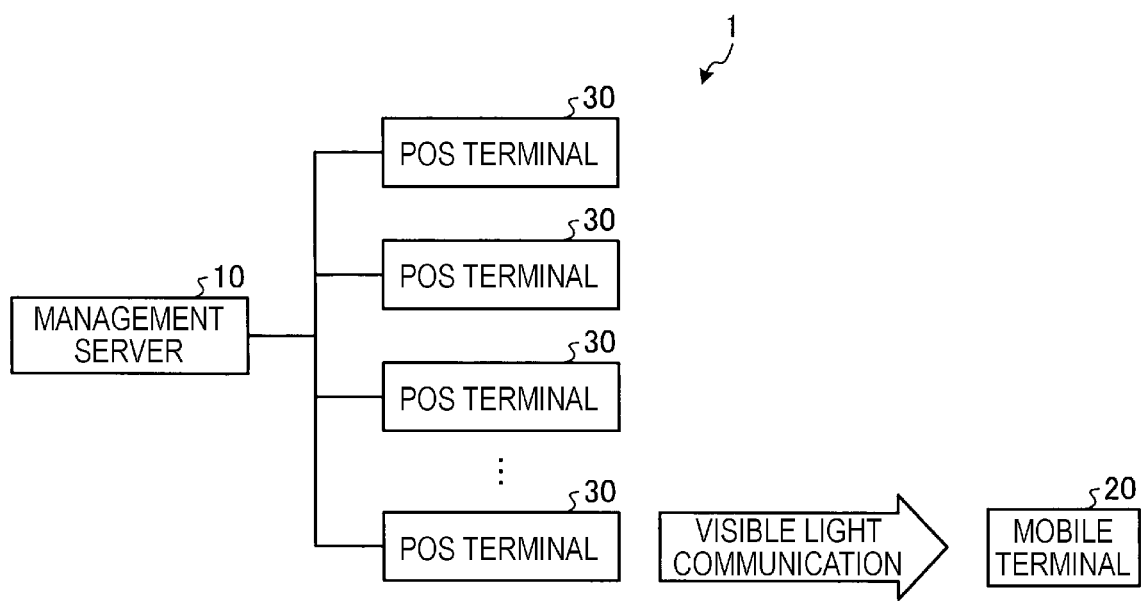
FIG. 1 is a diagram illustrating an example of a maintenance management system according to the present embodiment.

FIG. 1 is a diagram illustrating an example of a maintenance management system 1 according to the present embodiment. The maintenance management system 1 is a system that supports a maintenance work of a maintenance target device. The maintenance management system 1 includes a management server 10, a plurality of mobile terminals 20, and a plurality of point of sales (POS) terminals 30. The management server 10 and the plurality of POS terminals 30 are communicably connected via a network.

The management server 10 is a server device that manages the maintenance management system 1. The management server 10 records the information relating to a correct maintenance work for the POS terminal 30. Also, the management server 10 provides various kinds of information according to the request of the POS terminal 30. The management server 10 is not limited to one server device and may be configured with a plurality of server devices.

The mobile terminal 20 is a mobile terminal that is carried by each maintenance staff. For example, the mobile terminal 20 is a terminal such as a smartphone or a tablet terminal. The mobile terminal 20 supports the maintenance work by displaying various kinds of information relating to the maintenance work. The mobile terminal 20 displays whether the correct maintenance work is performed based on the information transmitted from the POS terminal 30 by the visible light communication. Specifically, when the correct maintenance work is performed, the mobile terminal 20 displays a maintenance work of the next process. Meanwhile, when a wrong maintenance work is performed, the mobile terminal 20 displays a content of the correct maintenance work.

The POS terminal 30 is a maintenance target device according to the present embodiment. According to the present embodiment, a case where the maintenance target device is the POS terminal 30 is described. However, the maintenance target device is not limited to the POS terminal 30 and may be another device. The POS terminal 30 is a device that performs a merchandise registration process for registering a merchandise to be sold and a payment process of the merchandise registered by the merchandise registration process.

The POS terminal 30 detects the maintenance work performed by the maintenance staff with the sensor provided in each unit of the POS terminal 30. The POS terminal 30 compares the information provided from the management server 10 with the detected maintenance work and determines whether the maintenance staff performs the correct maintenance work. The POS terminal 30 transmits the comparison result by the visible light communication. Therefore, when the maintenance staff performs a wrong maintenance work, the POS terminal 30 causes the mobile terminal 20 to display the content of the correct maintenance work.

As described above, when the maintenance staff performs a wrong maintenance work, the maintenance management system 1 supports the maintenance work by displaying the content of the correct maintenance work.

Subsequently, hardware configurations of various devices included in the maintenance management system 1 are described.

Figure 2:
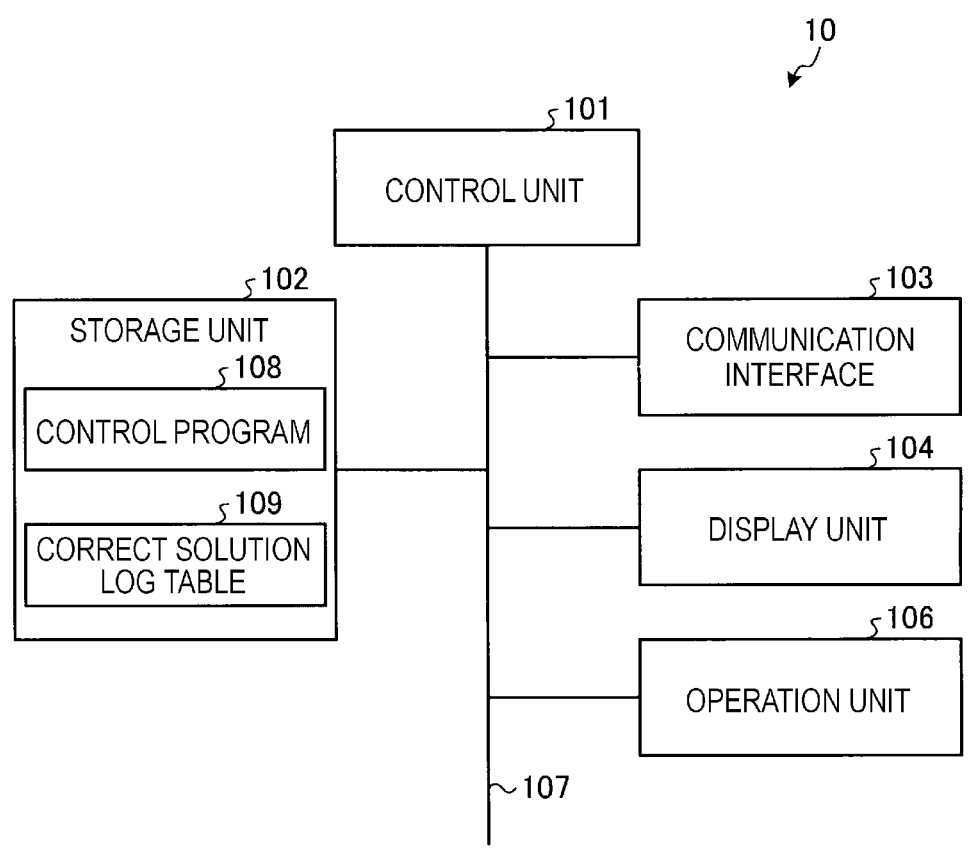
FIG. 2 is a block diagram illustrating an example of a hardware configuration of a management server.

FIG. 2 is a block diagram illustrating an example of a hardware configuration of the management server 10. The management server 10 includes a control unit 101, a storage unit 102, a communication interface 103, a display unit 104, and an operation unit 105. These units are connected to each other via a system bus 107 such as a data bus or an address bus.

The control unit 101 is a computer that controls the entire operation of the management server 10 and realizes various functions of the management server 10. The control unit 101 includes a central processing unit (CPU), a read only memory (ROM), and a random access memory (RAM). The CPU integrally controls the operation of the management server 10. The ROM is a storage medium that stores various programs or data. The RAM is a storage medium that temporarily stores various programs or various kinds of data. Also, the CPU executes a program stored in the ROM, the storage unit 102, or the like while using the RAM as the work area.

The storage unit 102 is a storage device such as a hard disk drive (HDD) or a solid state drive (SSD). The storage unit 102 stores a control program 108 and a correct solution log table 109. The correct solution log table 109 is not limited to be stored in the management server 10, but may be stored in other devices. The correct solution log table 109 is not limited to be stored in one device, but may be stored in a plurality of devices in a dispersed manner.

The control program 108 is a program for implementing functions of an operating system or the management server 10. The control program 108 includes a program for implementing a characteristic function according to the present embodiment.

The correct solution log table 109 is an information table having a log detected by the POS terminal 30 when correct maintenance works are performed in a correct procedure on a per maintenance content basis. In the correct solution log table 109, the maintenance content code, the correct solution logs, and an order of the correct solution logs correlate with each other. The maintenance content code is identification information capable of identifying a maintenance content. The correct solution log is a log detected when the correct maintenance work is performed. The order of the correct solution logs is an order in which the correct solution logs are detected.

The communication interface 103 is an interface for a communication with other devices via the network. For example, the communication interface 103 is an interface for a communication with the POS terminal 30.

The display unit 104 is, for example, a display device such as a liquid crystal display. The operation unit 105 is an input device such as a keyboard or a mouse.

Figure 3:
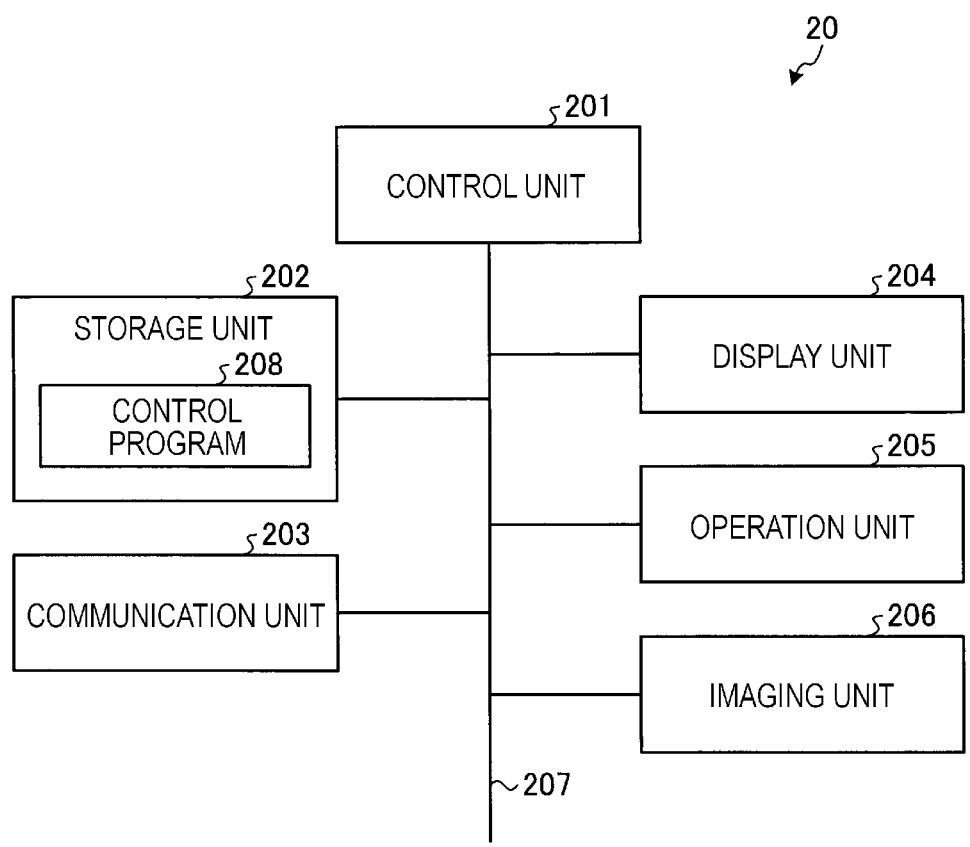
FIG. 3 is a block diagram illustrating an example of a hardware configuration of a mobile terminal.

FIG. 3 is a block diagram illustrating an example of a hardware configuration of the mobile terminal 20. The mobile terminal 20 includes a control unit 201, a storage unit 202, a communication unit 203, a display unit 204, an operation unit 205, and an imaging unit 206. These units are connected to each other via a system bus 207 such as a data bus or an address bus.

The control unit 201 is a computer that controls the entire operation of the mobile terminal 20 and realizes various functions of the mobile terminal 20. The control unit 201 includes a CPU, a ROM, and a RAM. The CPU integrally controls the operation of the mobile terminal 20. The ROM is a storage medium that records various programs or data. The RAM is a storage medium that temporarily records various programs or various kinds of data. Also, the CPU executes a program stored in the ROM, the storage unit 202, or the like while using the RAM as the work area.

The storage unit 202 is a storage device such as flash memory. The storage unit 202 records a control program 208. The control program 208 is a program for implementing functions of an operating system or the mobile terminal 20. The control program 208 includes a program for implementing a characteristic function according to the present embodiment.

The communication unit 203 is an interface for a communication with other devices via the network. For example, the communication unit 203 is an interface for a communication with the management server 10.

The display unit 204 is, for example, a display device such as a liquid crystal display. The operation unit 205 is an input device such as a touch pad that receives various operations by detecting a touched position on a screen of the display unit 204. The operation unit 205 may be a hardware button or the like.

The imaging unit 206 is a camera including an imaging element such as a complementary metal-oxide semiconductor (CMOS) or a charge coupled device (CCD). The imaging unit 206 images a display unit 304 of the POS terminal 30, to receive the information transmitted by the POS terminal 30 via the visible light communication.

Here, the maintenance staff is required to obtain permission of the store in order to connect the mobile terminal 20 to the network of the store where the POS terminal 30 is installed. However, when the information is received from the POS terminal 30 via the visible light communication, the mobile terminal 20 is not connected to the network of the store. Accordingly, the maintenance staff is not required to obtain the permission of the store in the visible light communication.

Figure 4:
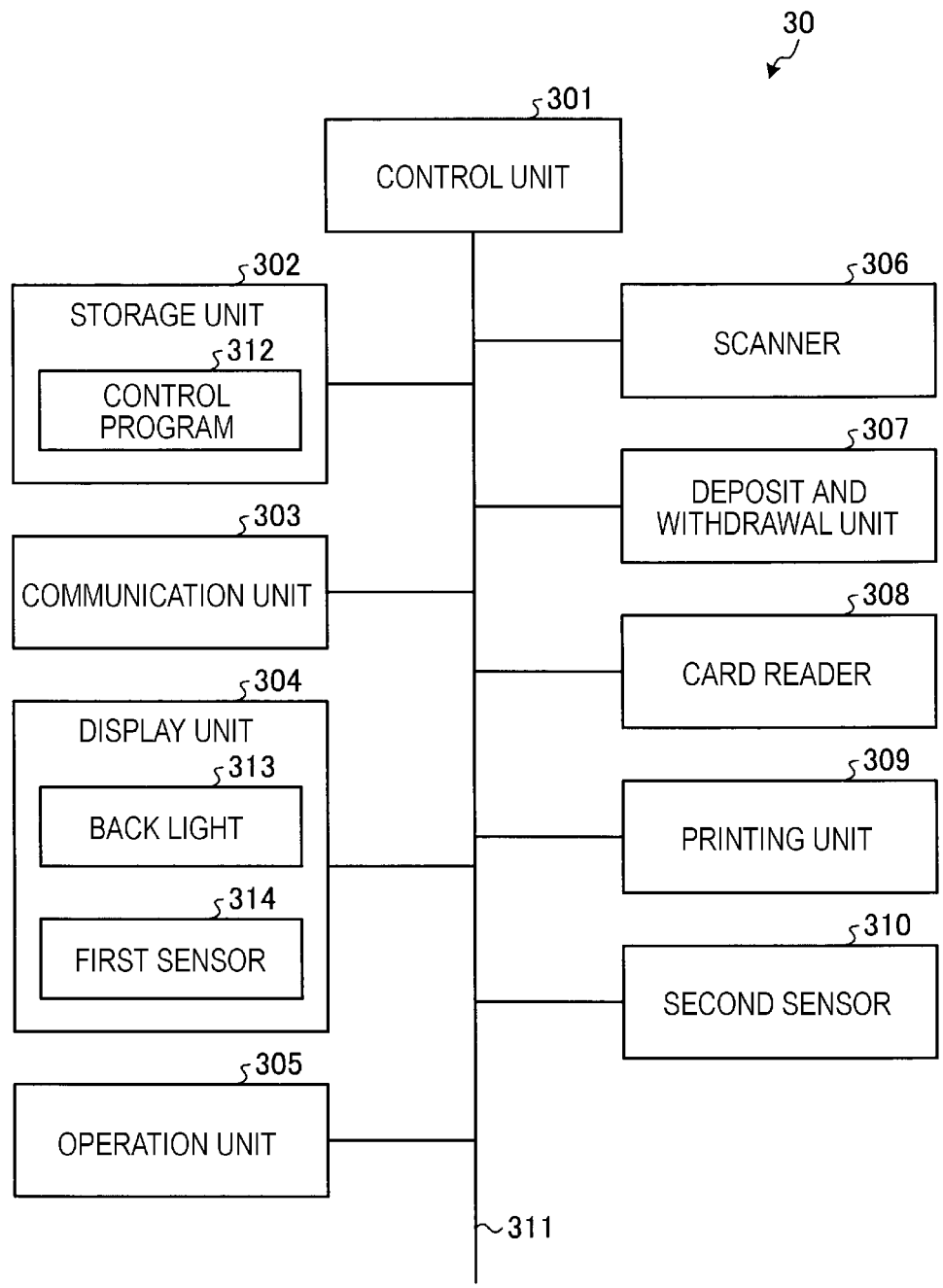
FIG. 4 is a block diagram illustrating an example of a hardware configuration of a POS terminal.

FIG. 4 is a block diagram illustrating an example of the hardware configuration of the POS terminal 30. The POS terminal 30 includes a control unit 301, a storage unit 302, a communication unit 303, the display unit 304, an operation unit 305, a scanner 306, a deposit and withdrawal unit 307, a card reader 308, a printing unit 309, and a second sensor 310. These units are connected to each other via a system bus 311 such as a data bus or an address bus.

The control unit 301 is a computer that controls the entire operation of the POS terminal 30 and realizes various functions of the POS terminal 30. The control unit 301 includes a CPU, a ROM, and a RAM. The CPU integrally controls the operation of the POS terminal 30. The ROM is a storage medium that records various programs or data. The RAM is a storage medium that temporarily records various programs or various kinds of data. Also, the CPU executes a program stored in the ROM, the storage unit 302, or the like while using the RAM as the work area.

The storage unit 302 is a storage device such as a HDD or a SSD. The storage unit 302 stores a control program 312. The control program 312 is a program for implementing functions of an operating system or the POS terminal 30. The control program 312 includes a program for implementing a characteristic function according to the present embodiment.

The communication interface 303 is an interface for a communication with other devices via the network. For example, the communication interface 303 communicates with the device connected to the network in the store where the POS terminal 30 is installed.

The display unit 304 is, for example, a display device such as a liquid crystal display. The display unit 304 includes a back light 313 that illuminates from the back surface of the liquid crystal and a first sensor 314. The back light 313 is a light emitting device such as a light emitting diode (LED). The back light 313 of the display unit 304 transmits various kinds of information by the visible light communication. Here, the visible light communication is a communication that transmits information by emitting visible light including information. In the present embodiment, a case where the back light 313 of the display unit 304 emits visible light including various kinds of information is described as an example. However, the POS terminal 30 may emit visible light including various kinds of information from an LED provided outside of the display unit 304, or a light emitting device other than the POS terminal 30 may emit visible light including various kinds of information.

The first sensor 314 is a sensor that detects a touched position touched by the maintenance staff on the display unit 304.

The operation unit 305 is an input device such as a touch pad that receives various operations by detecting a touched position on a screen of the display unit 304. The operation unit 305 may be a hardware button or the like.

The scanner 306 acquires a merchandise code capable of identifying a merchandise by reading a barcode attached to a merchandise.

The deposit and withdrawal unit 307 is an automatic change machine that deposits and withdraws money in a process such as a payment process. The deposit and withdrawal unit 307 receives money such as coins or bills deposited from a deposit port into a reception unit. The deposit and withdrawal unit 307 withdraws money such as coins or bills as a change, from the reception unit to the withdrawal port.

The card reader 308 reads a card such as a credit card.

The printing unit 309 is a printer for printing various kinds of information.

The second sensor 310 is a sensor provided in each unit of the POS terminal 30. For example, the second sensor 310 is a sensor that detects opening or closing of a cover or the like provided in the POS terminal 30.

Figure 5:
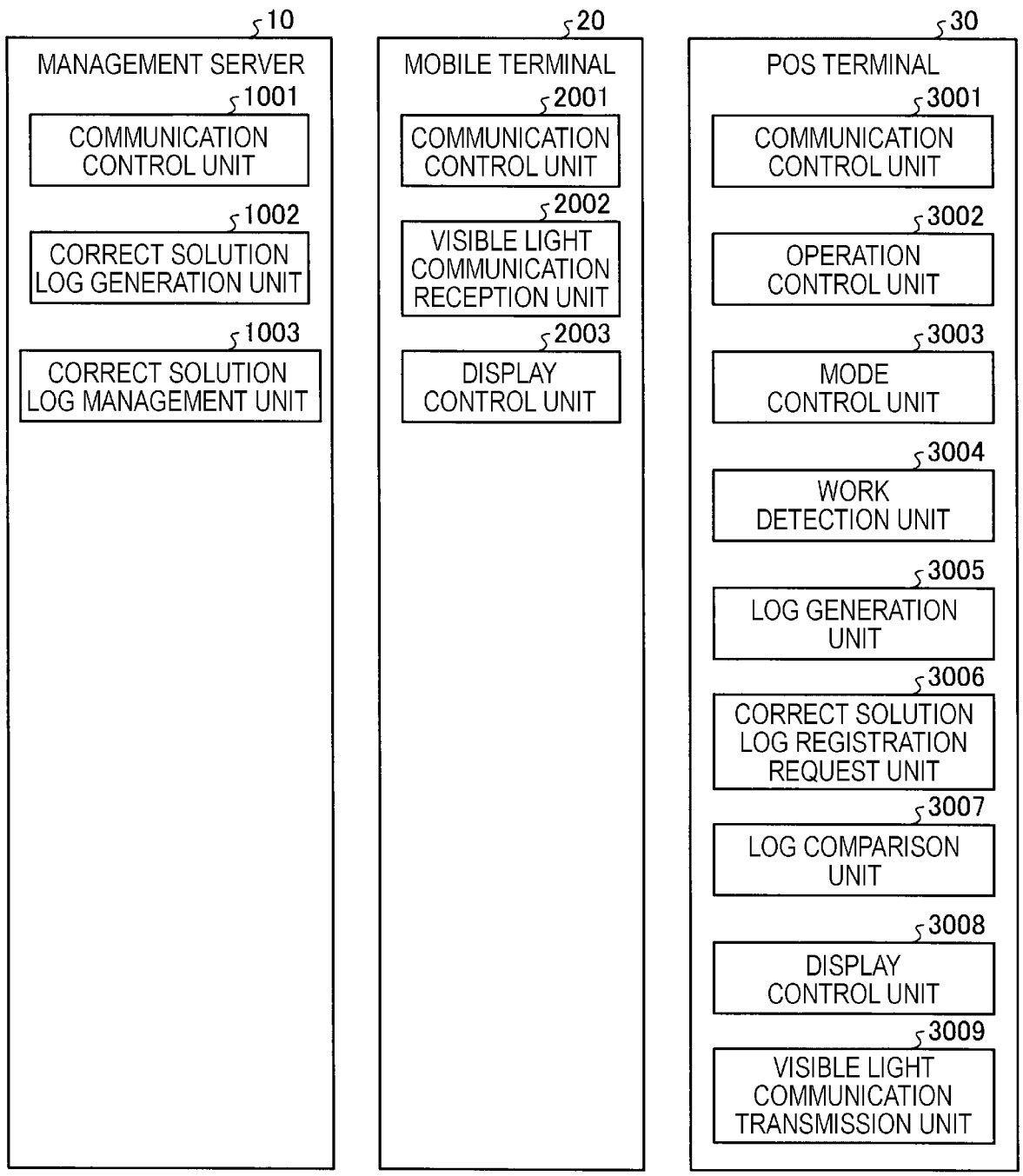
FIG. 5 is a block diagram illustrating a characteristic function configuration of each device of the maintenance management system.

Subsequently, a characteristic function of each device of the maintenance management system 1 is described. Here, FIG. 5 is a block diagram illustrating a characteristic function configuration of each device of the maintenance management system 1.

The control unit 101 of the management server 10 loads the control program 108 stored in the storage unit 102 into a RAM and is operated according to the control program 108 to generate each functional unit in the RAM. Specifically, the control unit 101 of the management server 10 includes a communication control unit 1001, a correct solution log generation unit 1002, and a correct solution log management unit 1003 as the functional units.

The communication control unit 1001 controls the communication interface 103 and performs communication with the POS terminal 30. For example, the communication control unit 1001 receives the correct solution log request for requesting a correct solution log from the POS terminal 30. Specifically, the communication control unit 1001 receives the maintenance content code, detection logs, and an order of generating the detection logs, which become the base of the correct solution log to be registered for the correct solution log table 109, from the management server 10. The communication control unit 1001 transmits the correct solution log as a response of the correct solution log request to the POS terminal 30.

The correct solution log generation unit 1002 generates the correct solution log based on the maintenance content code, the detection logs, and the order of the detection logs received by the communication control unit 1001. For example, the correct solution log generation unit 1002 generates the correct solution log by deleting unnecessary information from the information included in the detection log and adding a margin of signal detection.

The correct solution log management unit 1003 manages the correct solution log. For example, when the correct solution log generation unit 1002 generates the correct solution log, the correct solution log management unit 1003 registers the generated correct solution log for the correct solution log table 109. When the communication control unit 1001 receives the correct solution log request for requesting the correct solution log, the correct solution log management unit 1003 extracts the correct solution log specified by the maintenance content code included in the correct solution log request and the order thereof from the correct solution log table 109. The correct solution log management unit 1003 transmits the extracted correct solution log and order thereof to the communication control unit 1001.

The control unit 201 of the mobile terminal 20 loads the control program 208 stored in the storage unit 202 into a RAM and is operated according to the control program 208 to generate each functional unit in the RAM. Specifically, the control unit 201 of the mobile terminal 20 includes a communication control unit 2001, a visible light communication reception unit 2002, and a display control unit 2003 as the functional units.

The communication control unit 2001 controls the communication unit 203 and performs communication. For example, the communication control unit 2001 receives the information relating to the maintenance such as a procedure of the maintenance work, a check list, and a screen presenting specific contents of the maintenance work. The communication control unit 2001 may receive the information relating to the maintenance from the management server 10 and may receive the information from other devices.

The visible light communication reception unit 2002 controls the imaging unit 206 that receives visible light emitted from the POS terminal 30 and receives the information transmitted by the visible light communication. Specifically, the visible light communication reception unit 2002 receives the comparison result between the correct solution log which is the correct maintenance work in each process of the maintenance content and the detection log which is the log of the maintenance work of the maintenance staff detected by the POS terminal 30. That is, the visible light communication reception unit 2002 receives the comparison result indicating that the correct solution log and the detection log are identical to each other or the comparison result indicating that the correct solution log and the detection log are not identical to each other.

The display control unit 2003 controls the display unit 204 and causes various screens to be displayed. Specifically, the display control unit 2003 causes a screen having the information relating to the maintenance to be displayed. Specifically, the display control unit 2003 causes a message, a screen, or the like that indicates a work content to be performed in response to the maintenance work to be displayed. Accordingly, the display control unit 2003 supports the maintenance work of the maintenance staff.

The display control unit 2003 causes the maintenance work of each process of the maintenance content to be displayed based on the comparison result received by the visible light communication reception unit 2002. When the comparison result indicates that the correct solution log and the detection log are not identical to each other, the display control unit 2003 causes the screen presenting the maintenance work to display the content of the correct maintenance work. For example, the display control unit 2003 displays a message or a screen indicating that the maintenance work performed by the maintenance staff is wrong and indicating the correct maintenance work. The display control unit 2003 causes the screen indicating the maintenance work to display the maintenance work of the next process when the comparison result indicates that the correct solution log and the detection log are identical to each other. Accordingly, the maintenance staff can know the content of the maintenance work to be performed in the next process.

The control unit 301 of the POS terminal 30 loads the control program 312 stored in the storage unit 302 into a RAM and is operated according to the control program 312 to generate each functional unit in the RAM. Specifically, the control unit 301 of the POS terminal 30 includes a communication control unit 3001, an operation control unit 3002, a mode control unit 3003, a work detection unit 3004, a log generation unit 3005, a correct solution log registration request unit 3006, a log comparison unit 3007, a display control unit 3008, and a visible light communication transmission unit 3009 as the functional units.

The communication control unit 3001 controls the communication unit 303 and communicates with the management server 10. For example, the communication control unit 3001 transmits the maintenance content code, the detection logs, the order of generating the detection logs, and transmits the registration request for requesting the registration for the correct solution log table 109 as the correct solution log to the management server 10. The communication control unit 3001 transmits the correct solution log request for requesting the correct solution log to the management server 10. The communication control unit 3001 receives the correct solution log as a response to the correct solution log request from the management server 10.

The operation control unit 3002 controls the operation unit 305 and receives various operations.

The mode control unit 3003 controls the mode change of the POS terminal 30. Examples of the mode of the POS terminal 30 include the general mode and the maintenance mode. The general mode is a mode for performing the merchandise registration process for registering the merchandise to be sold and the payment process of the merchandise registered by the merchandise registration process. The maintenance mode is a mode set when the maintenance staff performs the maintenance. The mode control unit 3003 changes the general mode to the maintenance mode when the maintenance staff code, the password corresponding to the maintenance staff code, and the like are input. Here, the maintenance staff code and the password may be obtained by causing the operation unit 305 to receive an input or by causing the card reader 308 to read a card to receive an input, or may be input by other methods. The mode control unit 3003 changes the maintenance mode to the general mode when the operation for ending the maintenance is input in the maintenance mode.

The maintenance mode includes a correct solution recording mode and a maintenance supporting mode. The correct solution recording mode is a mode for generating a correct solution log. In the correct solution recording mode, the POS terminal 30 records a series of detection logs of the maintenance work in the storage unit 302 or the like. The maintenance supporting mode is a mode for supporting the maintenance staff. In the maintenance supporting mode, the POS terminal 30 compares the detection log and the generation log and determines whether the correct maintenance work is performed. Also, the POS terminal 30 transmits the comparison result to the mobile terminal 20 by the visible light communication. The mobile terminal 20 that receives the comparison result displays the screen according to the comparison result. Accordingly, the POS terminal 30 supports the maintenance work in the maintenance supporting mode.

The work detection unit 3004 detects the maintenance work performed by the maintenance staff based on the signals of the operation unit 305, the first sensor 314, and the second sensor 310. For example, the work detection unit 3004 detects the operation content for the display unit 304 as the maintenance work, based on the touched position of the maintenance staff detected by the first sensor 314 and the screen displayed by the display unit 304 when the screen is touched. The work detection unit 3004 detects opening and closing of the cover of the POS terminal 30 and the like as the maintenance work by the maintenance staff based on the detection by the second sensor 310.

The log generation unit 3005 generates the detection log based on the detection result of the work detection unit 3004. The log generation unit 3005 correlates the maintenance content code indicating the content of the maintenance performed when the detection log is generated, the generated detection logs, and the order of generating the detection logs.

The correct solution log registration request unit 3006 registers the detection log generated by the log generation unit 3005 for the correct solution log table 109 in which the correct solution log is recorded on a per maintenance content basis. That is, the correct solution log registration request unit 3006 transmits the registration request for requesting the registration of the detection logs generated by the log generation unit 3005 as the correct solution log to the communication control unit 3001. The registration request includes the maintenance content code, the detection logs, and the order of generating the detection logs correlating with the log generation unit 3005.

The log comparison unit 3007 compares the correct solution log which is the log of the correct maintenance work in each process of the maintenance content with the detection log which is the log of the maintenance work detected by the work detection unit 3004. That is, the log comparison unit 3007 compares the correct solution log with detection log generated by the log generation unit 3005. The log comparison unit 3007 generates the comparison result indicating whether or not the correct solution log and the detection log are identical to each other.

The display control unit 3008 controls the display unit 304 and causes the various screens to be displayed. For example, in the maintenance mode, the display control unit 3008 causes the screen indicating any one of the correct solution recording mode and the maintenance supporting mode to be displayed. The display control unit 3008 causes the screen indicating that the comparison result is being transmitted by the visible light communication to be displayed, when the comparison result is transmitted by the visible light communication. Therefore, the maintenance staff can know a timing for causing the mobile terminal 20 to direct the display unit 304 of the POS terminal 30.

The visible light communication transmission unit 3009 controls the back light 313 of the display unit 304 and transmits information by visible light communication. That is, the visible light communication transmission unit 3009 transmits the information by causing the back light 313 of the display unit 304 to blink at a high speed. For example, the visible light communication transmission unit 3009 transmits the comparison result between the correct solution log and the detection log by the log comparison unit 3007.

Subsequently, the operations of the maintenance management system 1 are described.

Figure 6:
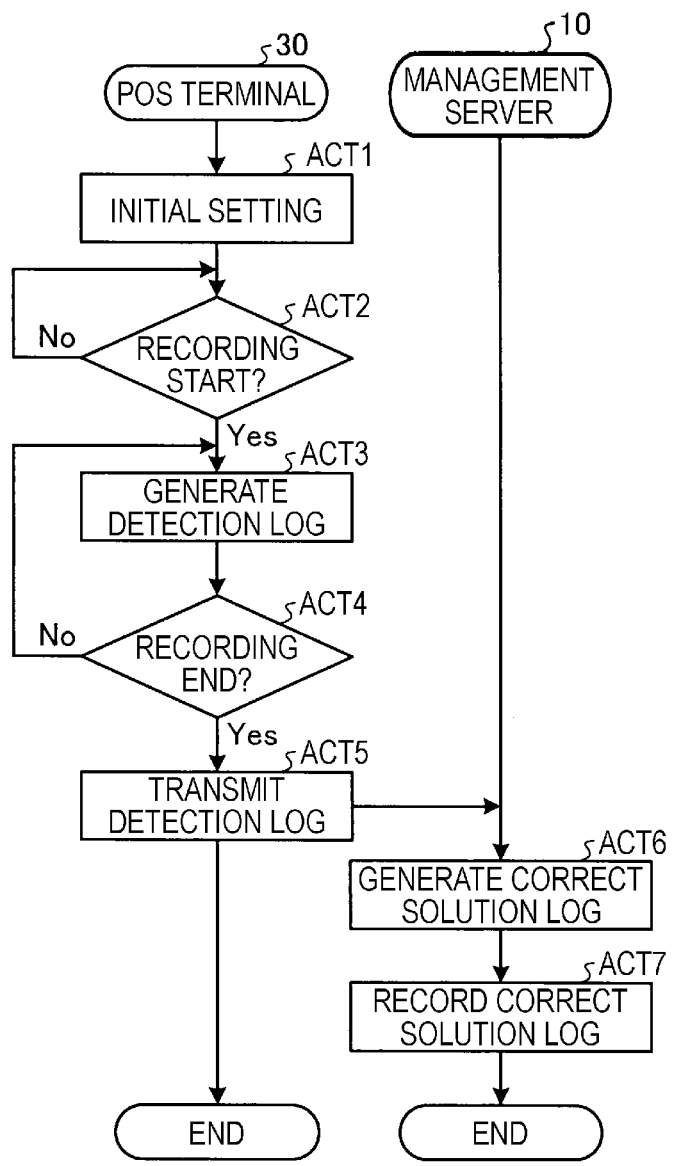
FIG. 6 is a flowchart for describing an example of a recording process performed by the maintenance management system.

FIG. 6 is a flowchart for describing an example of a recording process performed by the maintenance management system 1 of the present embodiment. The recording process is a process for recording an ideal procedure of the maintenance work.

The operation control unit 3002 of the POS terminal 30 receives initial setting (ACT 1). Specifically, the correct solution recording mode is set for the operation control unit 3002. The operation control unit 3002 receives the setting such as a maintenance content code or the like indicating the maintenance content to be a target of the recording process.

The operation control unit 3002 determines whether the operation of inputting an instruction of a recording start is received (ACT 2). When the operation of inputting an instruction of a recording start is not received (ACT 2; No), the operation control unit 3002 stands by.

When the operation of inputting the instruction of the recording start is received (ACT 2; Yes), the log generation unit 3005 generates the detection log which is the log of the maintenance work detected by the work detection unit 3004 after the operation of inputting the instruction of the recording start (ACT 3).

The operation control unit 3002 determines whether an operation of inputting an instruction of a recording end is received (ACT 4). When the operation of inputting the instruction of the recording end is not received (ACT 4; No), the log generation unit 3005 stands by. That is, the log generation unit 3005 generates the detection log on condition that the work detection unit 3004 detects the maintenance work.

When the operation of inputting the instruction of the recording end is received (ACT 4; Yes), the communication control unit 3001 transmits the maintenance content code, the detection logs, and the order of generating the detection logs to the management server 10 in a correlating manner (ACT 5). That is, the communication control unit 3001 transmits the registration request for causing the correct solution log based on the detection log to be registered for the correct solution log table 109.

The correct solution log generation unit 1002 of the management server 10 generates the correct solution log based on the detection log received by the communication control unit 1001 (ACT 6).

The correct solution log management unit 1003 registers the correct solution log generated by the correct solution log generation unit 1002, the order thereof, and the maintenance content code for the correct solution log table 109 in a correlating manner (ACT 7).

By the process described above, the maintenance management system 1 ends the recording process.

Figure 7:
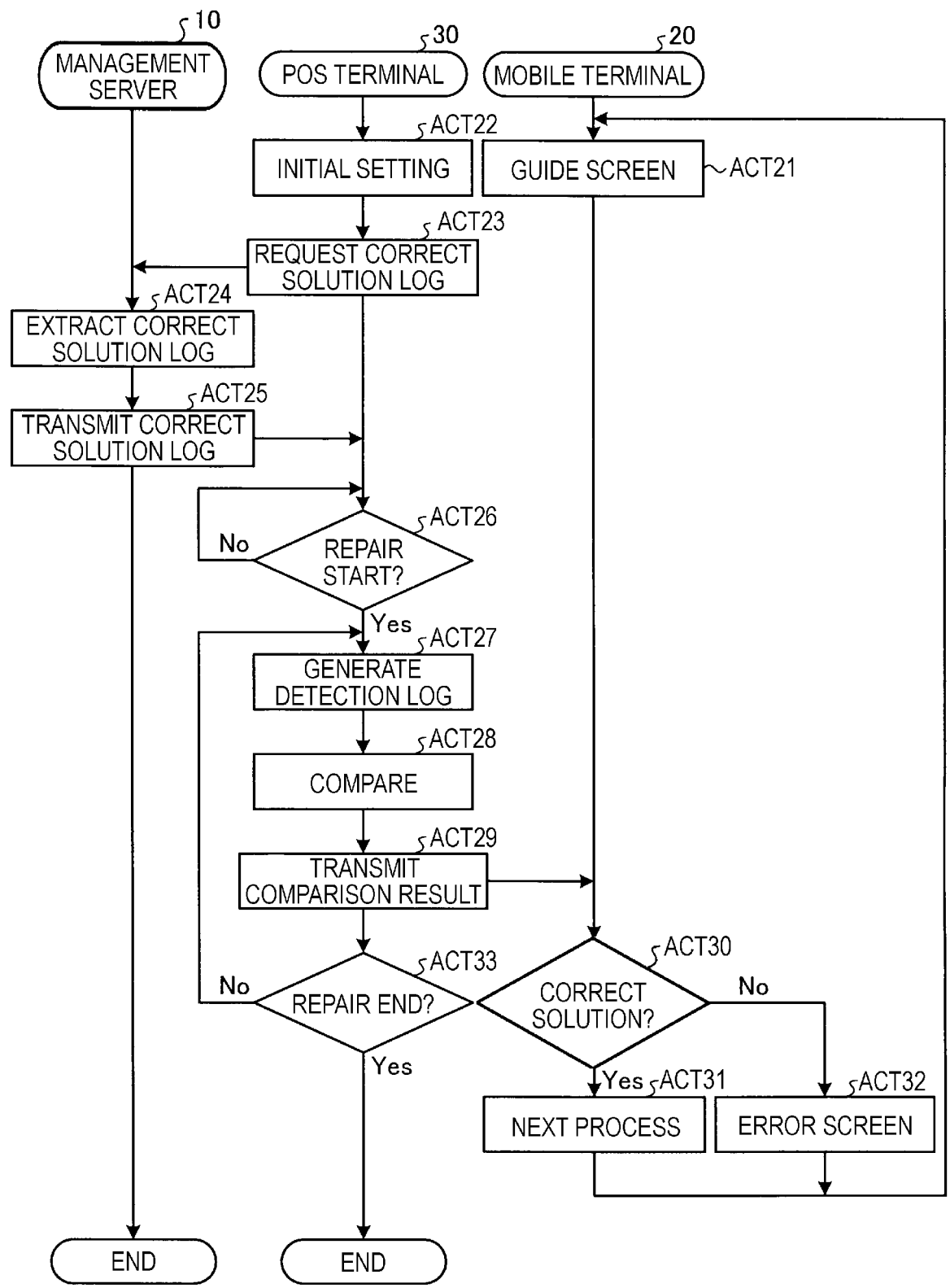
FIG. 7 is a flowchart illustrating an example of a maintenance supporting process performed by the maintenance management system.

FIG. 7 is a flowchart illustrating an example of a maintenance supporting process performed by the maintenance management system 1 of the present embodiment. The maintenance supporting process is a process for supporting an ideal procedure of the maintenance work.

The display control unit 2003 of the mobile terminal 20 displays a guide screen on which a maintenance work of a certain process is presented on the display unit 204 (ACT 21).

The operation control unit 3002 of the POS terminal 30 receives the initial setting (ACT 22). Specifically, the maintenance supporting mode is set for the operation control unit 3002. The operation control unit 3002 receives the setting of the maintenance content code or the like for presenting the maintenance content to be the target of the maintenance supporting process.

The communication control unit 3001 transmits the correct solution log request for requesting the correct solution log of the maintenance content to be the target of the maintenance supporting process to the management server 10 (ACT 23).

The correct solution log management unit 1003 of the management server 10 extracts the correct solution log of the maintenance content code included in the correct solution log request received by the communication control unit 1001 from the correct solution log table 109 (ACT 24).

The communication control unit 1001 transmits the correct solution log extracted by the correct solution log management unit 1003 to the POS terminal 30 (ACT 25).

The operation control unit 3002 determines whether the operation of inputting the instruction of the maintenance start is received (ACT 26). When the operation of inputting the instruction of the maintenance start is not received (ACT 26; No), the operation control unit 3002 stands by.

When the operation of inputting the instruction of the maintenance start is received (ACT 26; Yes), the log generation unit 3005 generates the detection log which is the log of the maintenance work detected by the work detection unit 3004 after the operation of inputting the instruction of the recording start (ACT 27).

The log comparison unit 3007 compares the detection log generated by the log generation unit 3005 with the correct solution log (ACT 28). That is, the log comparison unit 3007 determines whether an appropriate maintenance work is performed in an appropriate order.

The visible light communication transmission unit 3009 transmits the comparison result obtained from the comparison by the log comparison unit 3007 to the mobile terminal 20 (ACT 29).

The display control unit 2003 of the mobile terminal 20 determines whether the comparison result received by the visible light communication reception unit 2002 indicates the correct solution of the maintenance work (ACT 30). When the comparison result indicates the correct solution of the maintenance work (ACT 30; Yes), the display control unit 2003 selects a screen of the next process as the display target (ACT 31). Also, the display control unit 2003 displays the guide screen indicated by the maintenance work of the next process in ACT 21.

When the comparison result is not identical to the maintenance work (ACT 30; No), the display control unit 2003 causes an error screen indicating that an inappropriate maintenance work is performed to be displayed (ACT 32). The error screen includes the information indicating an appropriate maintenance work. The display control unit 2003 displays the guide screen in ACT 21 when the error screen is eliminated.

In ACT 33, the operation control unit 3002 of the POS terminal 30 determines whether the operation of inputting the instruction of the maintenance end is received (ACT 33). When the operation of inputting the instruction of the maintenance end is not received (ACT 33; No), the log generation unit 3005 generates the detection log which is the log of the maintenance work detected by the work detection unit 3004 in ACT 27.

When the operation of inputting the instruction of the maintenance end is received (ACT 33; Yes), the POS terminal 30 ends the maintenance supporting process.

By the process described above, the maintenance management system 1 ends the maintenance supporting process.

As described above, in the maintenance management system 1 according to the present embodiment, the POS terminal 30 detects the maintenance work of the maintenance staff with the first sensor 314, the second sensor 310, or the like. The POS terminal 30 compares the correct solution log which is the log of the correct maintenance work with the detection log which is the detected log of the maintenance work. The POS terminal 30 transmits the comparison result to the mobile terminal 20 of the maintenance staff. The mobile terminal 20 of the maintenance staff displays the maintenance work of each process of the maintenance content based on the received comparison result. For example, the mobile terminal 20 displays the maintenance work of the next process when the comparison result indicates that the correct solution log and the detection log are identical to each other. Meanwhile, the mobile terminal 20 displays the correct maintenance work when the comparison result indicates that the correct solution log and the detection log are not identical to each other. Accordingly, the maintenance management system 1 can support the maintenance work as the correct procedure.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

According to the embodiment, it is described that the imaging unit 206 of the mobile terminal 20 receives the visible light communication. However, the visible light communication may be received by other devices. The other devices that receive the visible light communication may transmit the reception content to the mobile terminal 20. Specifically, a surveillance camera may receive the visible light communication. A device connected to the surveillance camera may transmit the received content to the mobile terminal 20.

The program executed by each device of the above-described embodiments and modifications is provided by being installed in advance in a storage medium (ROM or storage unit) included in each device, but the embodiment is not limited to this. For example, the program may be configured to be recorded on a computer-readable recording medium such as a CD-ROM, a flexible disk (FD), a CD-R, a digital versatile disk (DVD) as a file provided in an installable or executable format, and provided. Further, the storage medium is not limited to a medium independent from the computer or the embedded system, but also includes a storage medium in which a program transmitted by LAN, the Internet, or the like is downloaded and stored or temporarily stored.

In addition, the program executed by each device of the above embodiment and a modification may be configured to be stored on a computer connected to a network such as the Internet and provided by downloading the program via the network or may be configured to be provided or distributed via a network such as the Internet.

What is claimed is:

1. A maintenance management system, comprising:
    a mobile terminal for a maintenance staff; and
    a maintenance target device in need of maintenance,
    wherein the maintenance target device includes:
        a detector for detecting a first log indicating a maintenance work on the maintenance target device,
        a first controller configured to compare the first log detected by the detector with a second log indicating a correct maintenance work associated with each maintenance process, and
        a transmitter configured to transmit a signal indicating a comparison result obtained by the controller, and
    the mobile terminal includes:
        a receiver configured to receive the comparison result signal, and
        a second controller configured to display information associated with the maintenance work on a display based on the comparison result received by the receiver,
    wherein the display controller displays the information indicating the correct maintenance work on the display when the comparison result indicates that the first log and the second log do not match.

2. The maintenance management system according to claim 1, further comprising
    a third controller configured to:
        generate a third log based on the first log, and
        register the third log as the second log in a storage unit, the second log being recorded on a per maintenance process basis.

3. The maintenance management system according to claim 1,
    wherein the display controller is configured to display a next process of the maintenance work when the comparison result indicates that the first log and the second log do not match.

4. The maintenance management system according to claim 1,
    wherein the transmitter transmits the comparison result by visible light communication.

5. The maintenance management system according to claim 1,
    wherein the maintenance target device is a POS terminal.

6. The maintenance management system according to claim 1 comprising a plurality of maintenance target devices.

7. The maintenance management system according to claim 6, wherein the plurality of maintenance target devices comprise a plurality of POS terminals.

8. A maintenance management method, comprising:
    detecting a first log indicating a maintenance work on a maintenance target device;
    comparing the first log detected with a second log indicating a correct maintenance work associated with each maintenance process;
    transmitting a signal indicating a comparison result obtained by the comparing;
    displaying information associated with the maintenance work on a display based on the comparison result; and
    displaying the information indicating the correct maintenance work on the display when the comparison result indicates that the first log and the second log do not match.

9. The maintenance management method according to claim 8, further comprising:
   generating a third log based on the first log; and
   registering the third log as the second log in a storage unit, the second log being recorded on a per maintenance process basis.

10. The maintenance management method according to claim 8, further comprising:
    displaying a next process of the maintenance work when the comparison result indicates that the first log and the second log do not match.

11. The maintenance management method according to claim 8, further comprising:
    transmitting the comparison result by visible light communication.

12. A POS terminal, comprising:
    a detector for detecting a first log indicating a maintenance work on a maintenance target device;
    a first controller configured to compare the first log detected by the detector with a second log indicating a correct maintenance work associated with each maintenance process; and
    a transmitter configured to transmit a signal indicating a comparison result obtained by the first controller to a receiver for receiving the comparison result on a mobile terminal for a maintenance staff,
    wherein the display controller is configured to display a next process of the maintenance work when the comparison result indicates that the first log and the second log do not match.

13. The POS terminal according to claim 12, further comprising:
    a third controller configured to:
       generate a third log based on the first log, and
       register the third log as the second log in a storage unit, the second log being recorded on a per maintenance process basis.

14. The POS terminal according to claim 12,
    wherein the display controller displays the information indicating the correct maintenance work on the display when the comparison result indicates that the first log and the second log do not match.

15. The POS terminal according to claim 12,
    wherein the transmitter transmits the comparison result by visible light communication.

16. The POS terminal according to claim 12,
    wherein the maintenance target device is a POS terminal.

17. The POS terminal according to claim 12 comprising a plurality of maintenance target devices.

* * * * *